United States Patent Office 3,647,768
Patented Mar. 7, 1972

3,647,768
PROCESS FOR PREPARING AMORPHOUS COPOLYMERS FROM ETHYLENE AND HIGHER α-OLEFINS BY MEANS OF MODIFIED ORGANOMETAL MIXED CATALYSTS
Helmut Schaum, Bad Soden, Taunus, Germany, assignor to Bunawerke Huls Gesellschaft mit beschrankter Haftung, Germany
Filed Sept. 27, 1968, Ser. No. 763,215
Claims priority, application Germany, Oct. 5, 1967, F 53,681
Int. Cl. C08f 1/56, 15/04
U.S. Cl. 260—80.78
15 Claims

ABSTRACT OF THE DISCLOSURE

Process for preparing rubber-like amorphous copolymers of ethylene with α-olefins in the presence of modified vanadium-containing mixed catalysts containing as reactivator halogen-containing, alkyl-substituted β-lactones. The catalyst yields are so high that in the case of the precipitation polymerization the polymerization mixture can be worked up by simple filtration. The polymers have a low ash content and are chemically and physically very uniform. The vulcanization products made therefrom have improved mechanical properties.

---

Figure 1:
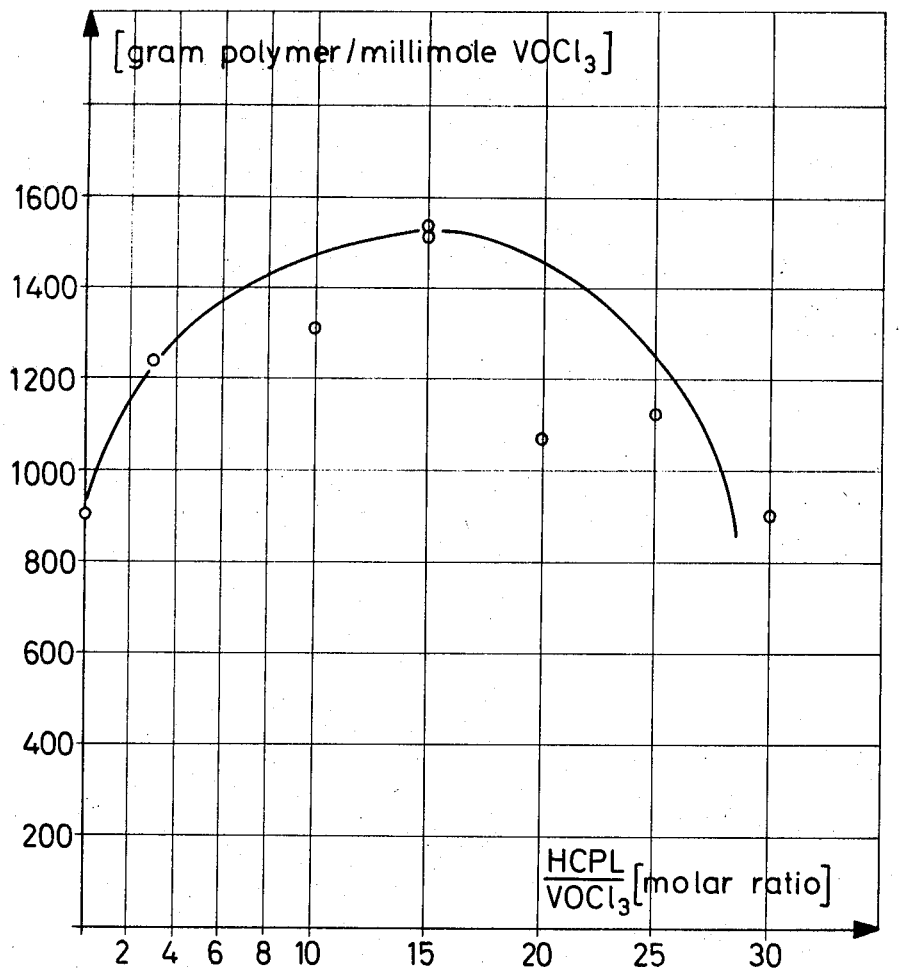

From Belgian Pat. 553,655 it is known to convert ethylene together with higher α-olefins into high-molecular copolymers by using organometal mixed catalysts known as "Ziegler Catalysts" and used in industrial practice, under pressures in the range of from 0 to 3° atmospheres gauge and at temperatures in the range of from —30° C. to +150° C. (so-called low pressure process).

When relatively high proportions of higher α-olefins are used (above about 25% by weight) the copolymers obtained according to the above-mentioned process are amorphous and can be used as rubber. The rubber-like copolymers containing a considerable proportion of higher α-olefins are soluble in aliphatic, aromatic and cycloaliphatic hydrocarbons and in some halohydrocarbons, for example, carbon tetrachloride, tetrachloroethylene and trichloroethylene.

The monomer mixture is in most cases polymerized in the specified solvents so that the copolymers are obtained in the form of highly viscous solutions (solution polymerization).

It is likewise known to modify the catalysts by using small amounts of additives.

According to Belgian Pat. No. 652,010 amorphous copolymers are produced by copolymerization of mixtures of α-olefins, if desired with diolefins, in a homogeneous phase with the aid of modified organometal mixed catalysts obtained by reacting vanadium compounds that are soluble in inert organic solvents with organo-aluminium compounds and an aliphatic halogen compound of the general formula C(X)$_3$Y wherein X represents a halogen atom and Y is a radical of the following composition:

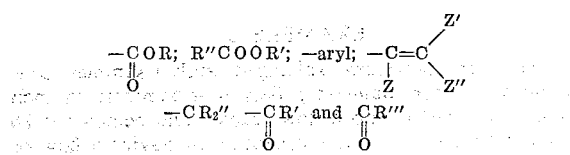

wherein R and R′ represent the following groups: -halogen, -alkyl, -halogenalkyl, -aryl, -halogenaryl, -alkaryl, R″ represents -alkylene, R‴ represents -alkyl, -halogenalkyl, -aryl, -halogenaryl, -alkaryl and Z is hydrogen, halogenalkyl, aryl and halogenaryl, Z′ and Z″ are halogen, halogenalkyl, alkyl, aryl and halogenaryl.

Furthermore, Belgian Pat. 628,896 discloses the preparation of amorphous copolymers of ethylene and α-olefins by using catalysts of dialkyl-aluminium halides and addition complex compounds of vanadium halides with a Lewis base, for instance with complexes of VCl$_3$, VCl$_4$ or VOCl$_3$ with diethylether, diisopropylether, diethoxy-ethane, tetrahydrofurane and dioxane.

It has also been proposed to carry out the copolymerization in liquids that do not dissolve the polymer. The number of suitable dispersion media is, however, limited because most of the dispersion media for these rubber-like copolymers react with the catalyst which thereby loses its activity.

British Patent 849,112 proposes the use of halohydrocarbons, for example methylene chloride, ethyl chloride, 1,2-dichloroethane and 1,1,2-trifluorotrichloroethane for preparing suspensions of said copolymers.

British Patent 925,468 proposes as suitable solvents for the preparation of suspensions of rubber-like copolymers of the aforesaid kind methylene chloride, ethyl chloride and 1,2-dichloroethane and uses polymerization temperatures which exceed neither the boiling point of said solvents nor 50° C. According to the above-mentioned patent the copolymers are worked up exclusively by extracting the catalyst with water after interrupting the polymerization with alcohol or water.

In order to avoid the industrially complicated working up it has been highly desirable to develop a process in which the catalyst efficiency, i.e. the yield calculated on the amount of catalyst used, is improved to an extent such that the catalyst may remain in the product without extraction while the solvent can be separated off by filtration and can be re-used without further purification, and the major proportion of the organo-aluminium compound of the catalyst is preserved for another polymerization. This is only possible, however, if the polymer yield is substantially increased with respect to the amount of catalyst used.

Now we have found a process for the copolymerization of ethylene together with α-olefins of the formula $$R\text{—}CH\text{=}CH_2$$ 

wherein R represents a branched or straight-chained aliphatic hydrocarbon radical having less than 7 carbon atoms, and, if desired, together with a diolefin in an amount such that the terpolymer formed has an iodine number not greater than 50, in the presence of inert solvents or dispersing media, the copolymerization being carried out under pressure in the range of from 0 to 30 atmospheres gauge and at temperatures in the range of from —30 to +80° C., with coordination catalysts of 3- to 5-valent vanadium compounds and organo-aluminium compounds, both soluble in the dispersing agent used, with stirring or other mechanical agitation, which comprises carrying out the polymerization, (1) By using the vanadium compounds in concentrations in the range of from 0.001 to 0.1 millimole per liter of dispersion medium, (2) By using organo-aluminium compounds the molar ratio of aluminium to vanadium of which being in the range of from 20 to 200, preferably 30 to 100 and (3) In the presence of halogen-containing, alkyl-substituted β-lactones as reactivators, the molar ratio of reactivator to vanadium compound being in the range of from 5 to 100, preferably 5–20.

The addition, according to the present invention, of, for instance, a β-trihalogenomethyl-β-lactone—wherein halogen means fluorine, chlorine or bromine—produced according to one of the processes named in the following table sub 1–4, increases the polymer yield about 2 to 3 times. When applying the solution polymerization as well as the precipitation polymerization the yield is increased by adding, for example, β-trihalogen-methyl-β-lactones.

As examples of halogen-containing, alkyl-substituted β-lactones used according to the invention there are mentioned the following compounds which are prepared according to the methods indicated:

gen, preferably chlorine, and $n$ is 1 to 3. There are mentioned, for example, $Al(C_2H_5)_2Cl$, $Al(C_2H_5)Cl_2$, $$Al(i-C_4H_9)_2Cl$$

$Al(i-C_4H_9)Cl_2$, $Al(C_2H_5)_3$ and $Al(i-C_4H_9)_3$. Preferably there are used compounds corresponding to the formula

| Preparation | Formula | Abbreviation | Literature |
|---|---|---|---|
| $CCl_3$<br>$\phantom{xx}\diagdown$<br>$\phantom{xxxx}C{=}O + H_2C{=}C{=}O \xrightarrow[70\%]{20°\ C.,\ uncat.}$<br>$\phantom{xx}\diagup$<br>$H$ | $CCl_3{-}\hspace{-2pt}\rule[-1ex]{0.1pt}{2.5ex}\hspace{-6pt}\rule[0pt]{1.5em}{0.1pt}\hspace{-1pt}O$<br>$\phantom{xxx}\rule[-1.5ex]{0.1pt}{2ex}\phantom{xxxx}\rule[-1.5ex]{0.1pt}{2ex}$<br>$\phantom{xxxx}\rule[-1ex]{1.5em}{0.1pt}{=}O$ | TCPL | (1 3) |
| $CCl_3$<br>$\phantom{xx}\diagdown$<br>$\phantom{xxxx}C{=}O + H_2C{=}C{=}O \xrightarrow[80\%]{190°\ C.,\ uncat.}$<br>$\phantom{xx}\diagup$<br>$CCl_3$ | $\phantom{xxx}CCl_3$<br>$CCl_3{-}\hspace{-2pt}\rule[-1ex]{0.1pt}{2.5ex}\hspace{-6pt}\rule[0pt]{1.5em}{0.1pt}\hspace{-1pt}O$<br>$\phantom{xxxx}\rule[-1ex]{1.5em}{0.1pt}{=}O$ | HCPL | (1) |
| $CCl_3\phantom{xxxxxx}H_3C$<br>$\phantom{xx}\diagdown\phantom{xxxx}\diagdown$<br>$\phantom{xxxx}C{=}O + \phantom{xx}C{=}C{=}O \xrightarrow[60\%]{-15°\ C.,\ BF_3\text{-etherate}}$<br>$\phantom{xx}\diagup\phantom{xxxxx}\diagup$<br>$H\phantom{xxxxxxx}H_3C\phantom{x}(2)$ | $CCl_3{-}\hspace{-2pt}\rule[-1ex]{0.1pt}{2.5ex}\hspace{-6pt}\rule[0pt]{1.5em}{0.1pt}\hspace{-1pt}O$<br>$CH_3{-}\hspace{-2pt}\rule[-1ex]{0.1pt}{2.5ex}\hspace{-6pt}\rule[0pt]{1.5em}{0.1pt}{=}O$<br>$\phantom{xxx}CH_3$ | DMTCPL | (1) |
| $F_3C\phantom{xxxxx}CH_3{-}CO$<br>$\phantom{xx}\diagdown\phantom{xxxxxxx}\diagdown$<br>$\phantom{xxxx}C{=}O + \phantom{xxxxxx}O \xrightarrow[\Delta,\ 26\%]{100°\ C.}$<br>$\phantom{xx}\diagup\phantom{xxxxxxx}\diagup$<br>$F_3C\phantom{xxxxx}CH_3{-}CO$ | $\phantom{xxx}CF_3$<br>$F_3C{-}\hspace{-2pt}\rule[-1ex]{0.1pt}{2.5ex}\hspace{-6pt}\rule[0pt]{1.5em}{0.1pt}\hspace{-1pt}O$<br>$\phantom{xxxx}\rule[-1ex]{1.5em}{0.1pt}{=}O$ | HFPL | (1 4) |

Wherein represent:
TCPL=β-trichloromethyl-β-propiolactone.
HCPL=β,β-bis-trichloromethyl-β-propiolactone.
DMTCPL=α, α-dimethyl-β-trichloromethyl-β-propiolactone.
HFPL=β, β-bis-trifluoromethyl-β-propiolactone.
[1] H. Ohse, R. Palm and H. Cherdron, Monatshefte der Chemie, in print. E. Schimmedlschmidt and E. Mundlos German Patent 1,136,323

(Farbwerke Hoechst). D. Borrmann, R. Wegler German Patent 1,214,211 and Chem. Ber. 99 No. 4, 1245–1251 (1966).
[2] Preparation of dimethylketene by H. Bestian and D. Gunther Angew. Chem. 75,841 (1963).
[3] F. J. Luknitzku and B. A. Vovsi Z. org. Chim. 2 (1966). No. 10 p. 1895, RA-Patent 176,882 of 28.11.64 (published June 1966).
[4] Iu. V. Zejfman and I. L. Knunjanc Izv. Akad. SSSR, 1966, No. 9, pp. 1661–1662.

The products obtained by using this modified catalyst system show properties that are of great advantage in industrial practice, for instance, higher vulcanization velocity and better confection adhesiveness. Due to their being easily accessible the reactivating compounds used according to the process of the present invention are particularly suitable for the purpose in question.

The halogen-containing, alkyl-substituted β-lactones are a constituent of the catalyst and are not incorporated into the copolymer as could be demonstrated by infrared spectroscopic analysis of polymers purified by reprecipitation.

The process according to the present invention is of particular advantage when materialized in precipitation polymerization. The high catalyst efficiency attained by using these reactivators, with the indicated amounts of catalyst, the specified ratio of the catalyst components and the solvents not or only slightly dissolving the rubber, enables the polymerization batch to be worked up without the addition of water by filtration, so that it is not necessary, as in the hitherto known processes. (cf. Britich Pat. 925,468) to free the copolymers or the solvent from water or alcohol, this being of particular advantage, as already a very slight amount of said H-acidic compounds in the recycled solvent would deactivate the catalyst. The copolymers produced by the process of the invention have a very low ash (equal to or inferior to 0.09%) and chlorine content (equal to or inferior to 600 p.p.m.).

As catalyst for the copolymerization of ethylene with higher α-olefins and possibly poly-unsaturated compounds there are used coordination catalysts which are soluble in the dispersion medium and comprise (a) A vanadium compound, for example, $VOCl_3$, $VCl_4$, vanadium trisacetylacetonate, vanadium hydroxydiacetylacetonate, vanadium naphthenate, vanadium benzoate, vanadylester, for example $VO(i-C_4H_9)_3$, $VO(i-C_3H_7)_3$, $VO(OC_2H_5)Cl_2$, $VO(OC_2H_5)_2Cl$, preferably $VOCl_3$.

(b) An organo-aluminium compound of the formula $AlR_nX_{3-n}$, in which R represents an alkyl group with 1 to 16, preferably 2 to 6 carbon atoms, X represents halo- $Al_2R_3Cl_3$ wherein R represents an alkyl group with 1 to 4 carbon atoms, for example $Al_2(C_2H_5)_3Cl_3$, $$Al_2(i-C_4H_9)_3Cl_3$$

As organo-aluminium compounds there are likewise suitable polymeric activators, such as aluminium-isoprenyl, the reaction product of aluminium-trialkyls with isopren; and (c) A halogen-containing, alkyl-substituted β-lactone.

A substantial, unexpected advantage of the process of the present invention is that, because of the extremely high activity of the above-mentioned modified Ziegler catalysts, rubber-like copolymers of olefins are obtained with very high space-time yields, as can be seen from the examples; this particularly applies to the precipitation polymerization. This is the more surprising as by addition of increasing amounts of the reactivating compounds mentioned sub (c)—after exceeding the optimum—an increasing inhibition of the polymerization is observed.

Moreover, it is advantageous that with the modified Ziegler catalysts of the present invention products are obtained which have uniform chemical and physical properties, probably because the olefins are more uniformly reacted during the mixed polymerization and that the vulcanization products thereof have improved mechanical properties.

In the process of British Pat. 925,468 mentioned above a halogen-containing, alkyl-substituted β-lactone is not used as reactivator and if the copolymer produced in this manner were worked up without the use of water, the ash content would also be considerably higher because of the higher need of catalyst, and could only be reduced by a subsequent extraction with water, possible after deactivation with alcohol as described above.

In the process of the present invention, however, in which dispersing media are used that do not dissolve the rubber, the polymer is simply filtered off, it is completely freed from the solvent and the latter is reconducted into the polymerization vessel. In this manner products are obtained in a multiple yield having a very low ash content.

Furthermore, the process of the present invention offers, in the case of the precipitation polymerization, the advantage that the solvent can be used again without further treatment, whereby the major part of the organoaluminium compound is preserved for the further polymerization and the reconducted α-olefins are not contaminated or diluted by the gaseous paraffin hydrocarbons formed during the otherwise usual deactivation by means of water or alcohol.

In the case of solution polymerization the solvent is removed by steam distillation. Moreover, it is possible to precipitate the rubber by means of miscible non-dissolvers, for example, methanol, ethanol, acetone, and to dry it subsequently.

The highly active mixed catalyst suitable for the copolymerization is advantageously formed in the polymerization vessel by continuously introducing separate solutions of the vanadium compound and the organo-aluminium component in a constant ratio. The halogen-containing, alkyl-substituted β-lactones used as reactivators can be previously mixed with the vanadium compound or they can be metered in separately.

As solvents for the catalyst components the above-mentioned dispersion media are suitably used.

The molar ratio of organo-aluminium compound to vanadium compound may vary within wide limits, for example, from 20 to 200 and, preferably, from 30 to 100.

When using a halogen-containing, alkyl-substituted β-lactone as reactivator according to the process of the present invention, the molar ratio of reactivator to vanadium compound should amount to a range of from 5 to 100, preferably 5 to 20, and the vanadium compound is used in concentrations in the range of from 0.001 to 0.1 millimole per liter of dispersion medium.

When the catalyst components are continuously added to the polymerization mixture as indicated above and the polymerization is carried out discontinuously, the indicated concentration is the final concentration which is reached only when the mixture already contains a certain amount of polymer.

From Belgian Pat. 695,774 it is known that elastic rubber products which may be crosslinked with sulfur can be obtained from said olefin copolymers if into the forming copolymers a small amount of a doubly unsaturated compound is incorporated, the one double linkage of which participates in the polymerization whereas the other double linkage is kept for an additional sulfur vulcanization.

In U.S. application Ser. No. 717,760, filed Apr. 1, 1968, not belonging to the state of the art, there are proposed, amongst others, the following third components: 1,4-cis-hexadiene, 1,4-trans-hexadiene, alkenyl-norbornenes such as 5-(2'- and/or 3'-methyl-2'-butenyl)-norbornene-2, alkylidene-norbornenes such as 5-methylene-norbornene-2, or 5-ethylidene-norbornene-2, dicyclopentadiene, butadiene-1,3 or isopren.

They are used in suitable amounts so that the formed terpolymer shows an iodine number of up to 50, preferably 3–50. According to the process of the present invention terpolymers of this type can advantageously be prepared, too.

In order to produce a rubber having good properties of use after vulcanization the catalyst systems must be used in the form of homogeneous solutions.

In the process of the present invention ethylene can be copolymerized with propylene, butene-1, isobutene, pentene-1, hexene-1, 4-methyl-pentene-1 and other branched or straight-chain α-olefins having up to 8 carbon atoms, propylene being preferred. Ethylene and propylene are copolymerized in a proportion such that the copolymers obtained have elastic, rubber-like properties, that is to say the proportion of ethylene in the copolymer can be as high as from 20 to 80% by weight, preferably from 30 to 75% by weight.

The copolymerization can be carried out at temperatures in the range of from −30° C. to +50° C., preferably −10° C. to +40° C., and under pressures of from 0 to 30 atmospheres gauge, either batchwise or continuously. When the polymerization is carried out as precipitation polymerization it can be materialized in the presence of 0.0001 to 10% by weight, calculated on the dispersion medium, of a finely divided inert solid having a large surface and a particle size of from 0.005 to 100 microns which does not inhibit the polymerization activity and is insoluble both in the dispersion medium and the separating polymerization product.

Suitable additives of this kind are, for example, the following inorganic compounds:

chlorides, for example, NaCl and KCl,
fluorides, for example, NaF, $CaF_2$, $KF—BF_3$, $2KF·SiF_4$, $Na_3AlF_6$,
sulfates, for example, $K_2SO_4$, $Na_2SO_4$, $CaSO_4$, $BaSO_4$, glauberite, nitrates, for example, $NaNO_3$, $KNO_3$,
phosphates, for example, $Ca_3(PO_4)_2$, apatite, hydroxylapatite,
carbonates, for example, $CaCO_3$, $MgCO_3$, $Na_2CO_3$, $K_2CO_3$, $ZnCO_3$,
silicates, for example, talcum, kaolinite, $SiO_2$, for example in the form of xerogels, diatomite and Aerosil (registered trademark),
aluminium silicates, for example, feldspar and oligoklas,
aluminates, for example, spinel and zinc spinel,
borates, for example, $Na_2B_4O_7$,
oxides, for example, $Al_2O_3$, AlOOH, $Fe_2O_3$, PbO, $TiO_2$, ZnO, CaO, MgO.

Furthermore there are suitable as additives finely divided polymers, for example polyethylene, polypropylene, poly-4-methyl-pentene-1, or polyacrylonitrile.

When applying the precipitation polymerization according to the process of the present invention, the polymerization is carried out in methylene chloride, ethyl chloride, 1,2-dichloro-ethane, 1,2-dichloropropane, 1,1,2-trifluoro-trichloroethane or other halohydrocarbons, preferably methylene chloride and 1,2-dichloroethane as dispersion medium, as far as they do not dissolve the copolymer under the reaction conditions.

When applying the solution polymerization the following solvents are used, for example: aliphatic, cycloaliphatic, aromatic, aliphatic-aromatic hydrocarbons, especially hexane, heptane, cyclohexane, benzene, toluene and halogenated hydrocarbons dissolving the rubber, for instance tetrachloroethylene; hydrogenated Diesel oil fractions may likewise be used.

The polymerization can also be carried out in liquid propylene.

The polymers can be crosslinked using organic peroxides, if desired with the addition of sulfur, at temperatures in the range of from 100° C. to 240° C. When diolefiins are incorporated into the polymers by polymerization the vulcanization can be realized by means of sulfur as usually added in rubber industries or of sulfur compounds and accelerators, by heating to 100–240° C. within a period of from several minutes to several hours. The following examples illustrate the invention:

EXAMPLE 1

Solution polymerization in hexane

Discontinuous copolymerization of ethylene and propylene in hexane with varying molar ratios of β,β-bis-trichloromethyl-β-propiolactone to vanadium oxytrichloride. In a glass vessel having a capacity of 3.5 liters, provided with a perforated blade stirrer of stainless steel, two ground in dropping funnels, a reflux condenser with connected mercury excess pressure valve, a gas inlet tube and thermometer, 2.8 liters of hexane previously purified over a column with potassium hydroxide and silicagel are saturated with exclusion of air and moisture, at 15° C. and atmospheric pressure, while stirring, with a gas mixture consisting of 1 part by volume of ethylene and 2 parts by volume of propylene. After care has thus been taken that the monomer mixture has the right composition for the production of uniform products, $VOCl_3$ (0.2 millimole in 100 milliliters of hexane) and ethyl-aluminium-sesquichloride (20 millimoles Al in 100 milliliters of hexane) are uniformly dropped within 100 minutes at 15° C. into the hexane saturated with ethylene and propylene in a ratio by volume of 1:2. The monomer mixture (ethylene/propylene=2:1) is then introduced in an amount to compensate pressure. The amount of $\beta,\beta$-bis-trichloromethyl-$\beta$-propiolactone (=HCPl) mentioned in Table 1 is then added to the solution of vanadium-oxytrichloride. The copolymer is obtained in the form of a solution; by removal of the solvent it is precipitated by means of steam and dried at 50° C. under reduced pressure.

The yield and the properties of the products obtained with the varying ratios of HCPl:vanadium-oxytrichloride are indicated in Table 1. The products obtained can be vulcanized with peroxides by the usual methods. They are amorphous, as results from measurements by differential thermo-analysis.

saturated with exclusion of air and moisture, at 15° C. and under atmospheric pressure, while stirring, with a gas mixture consisting of 5 parts by volume of ethylene and 6 parts by volume of propylene. When, prior to the start of polymerization the monomer mixture has the right composition for the production of uniform products 0.02 millimol of $VOCl_3$ are at first added at 15° C. to the methylene-chloride saturated with ethylene and propylene in a ratio by volume of 5:6. Ethyl-aluminium-sesquichloride (a solution of 20 millimoles of Al in 100 milliliters of methylene-chloride) is then dropwise added, until the polymerization sets in, detectable by the subatmospheric pressure formed in the reaction vessel. The monomer mixture (ethylene:propylene=2:1) is added in an amount to compensate pressure and $VOCl_3$ (0.18 millimole in 100 milliliters of methylene-chloride) and ethyl-aluminium-sesquichloride (20 millimoles of Al in 100 milliliters of methylene-chloride) are uniformly added dropwise to the system within 100 minutes. The amount of HCPL indicated in Table 2 is then added to the vana-

TABLE 1

Discontinuous copolymerization of ethylene and propylene in hexane with varying molar ratios of $\beta,\beta$-bis-trichloromethyl-$\beta$-propiolactone to vanadium oxytrichloride General reaction conditions:
Solvent: Hexane
Molar ratio: Al:V=60:1
V-concentration: 0.2 millimole/3 liters of hexane
Polymerization temperature: +15° C.

| Example | HCPL-vanadium oxytrichloride (molar ratio) | Yield (g.) | Catalyst efficiency (grams of polymer/ millimole of VOCl) | $\mu$ red [1] | Mooney viscosity [2], ML4 | Propyl in polymer | Percent insoluble in toluene |
|---|---|---|---|---|---|---|---|
| (a) [1] | 0:1 | 50 | 250 | 9.5 | 95 | 39 | 0.4 |
| (b) | 2:1 | 58 | 290 | 9.2 | 92 | 38 | 0.5 |
| (c) | 4:1 | 60 | 300 | 10.2 | 93 | 39 | 0.8 |
| (d) | 6:1 | 77 | 385 | 3.7 | 93 | 42 | 0.3 |
| (e) | 8:1 | 83 | 415 | 3.7 | 100 | 44 | 0.5 |
| (f) | 10:1 | 122 | 620 | 6.2 | 100 | 48 | 0.5 |
| (g) | 15:1 | 146 | 730 | 4.3 | 90 | 45 | 0.6 |
| (h) | 20:1 | 164 | 820 | 4.3 | 98 | 42 | 0.5 |
| (i) | 25:1 | 240 | 1,200 | 3.9 | 91 | 43 | 0.8 |
| (k) | 30:1 | 315 | 1,575 | 2.4 | 49 | 40 | 0.4 |

[1] $\mu$ red: reduced specific viscosity, measured at 135° C. in 0.1% dekahydronaphthalene solution.
[2] Determined according to DIN 53 523 at 100° C.

EXAMPLE 2

Precipitation polymerization in methylene-chloride

Discontinuous copolymerization of ethylene and propylene in methylene-chloride at varying molar ratios of $\beta,\beta$-bis-(trichloromethyl) - $\beta$ - propiolactone (=HCPl): vanadium-oxytrichloride.

In a glass vessel having a capacity of 3 liters, provided with a perforated blade stirrer of stainless steel, two ground in dropping funnels, a reflux condenser with connected mercury excess pressure valve, a gas inlet tube and thermometer, 1.8 liter of methylene chloride are dium-oxytrichloride solution. The copolymer is obtained in the form of small balls which are filtered off and dried. The yields of the products obtained with the varying ratios of HCPL:vanadium-oxytrichloride are indicated in Table 2.

The products obtained can be vulcanized with peroxides in the usual manner. They are amorphous as results from measurements by differential thermo-analysis.

TABLE 2

Discontinuous copolymerization of ethylene and propylene in methylene chloride with varying molar ratios of $\beta,\beta$-bis-propiolactone (HCPL): vanadium oxytrichloride (cf. also FIG. 1) (trichloromethyl)-$\beta$-

General reaction conditions:
Dispersion medium: Methylene chloride
Molar ratio: Al:V=100:1
V-concentration: 0.1 millimole/liter of methylene chloride
Polymeriz. temperature: +15° C.

| Example | HCPL-vanadium-oxytrichloride (molar ratio) | Yield (g.) | Catalyst efficiency (g. of polym./ llimole OCl3) | $\mu$ red [1] | Mooney visc.,[2] ML4 | Propylene in polym. (percent by weight) | Percent insoluble in toluene |
|---|---|---|---|---|---|---|---|
| 2a [3] | 0:1 | 180 | 900 | 3.5 | 120 | 35 | 0.2 |
| 2b | 5:1 | 248 | 1,240 | 2.9 | 95 | 41 | 0.5 |
| 2c | 10:1 | 262 | 1,310 | 2.9 | 89 | 40 | 0.2 |
| 2d | 15:1 | 307 | 1,535 | 3.1 | 111 | 40 | 0.3 |
| 2e | 15:1 | 303 | 1,515 | 2.9 | 103 | 43 | 0.3 |
| 2f | 20:1 | 215 | 1,075 | 3.0 | 106 | 41 | 0.1 |
| 2g | 25:1 | 225 | 1,125 | 3.1 | 125 | 39 | 0.5 |
| 2h | 30:1 | 180 | 900 | 2.8 | 82 | 42 | 1.0 |

[1] $\mu$ red: reduced specific viscosity, measured at 135° C. in 0.1% dekahydronaphthalene solution.
[2] Determined according to DIN 53 523 at 100° C.
[3] Comparison test.

EXAMPLE 3

Precipitation polymerization in methylene-chloride

Discontinuous copolymerization of ethylene and propylene in methylene-chloride with varying molar ratios of β-trichloro-methyl-β-propiolactone (TCPL) to vanadium oxytrichloride. The copolymerization is carried out as described in Example 1 but instead of β,β-bis(trichloromethyl)-β-propiolactone (HCPL) trichloromethyl-β-propiolactone (TCPL) is added to the catalyst system. The yields obtained and the properties of the product are indicated in Table 3. The copolymers are amorphous as shown by the measuring results obtained by differential thermoanalysis.

TABLE 3

Figure 2:
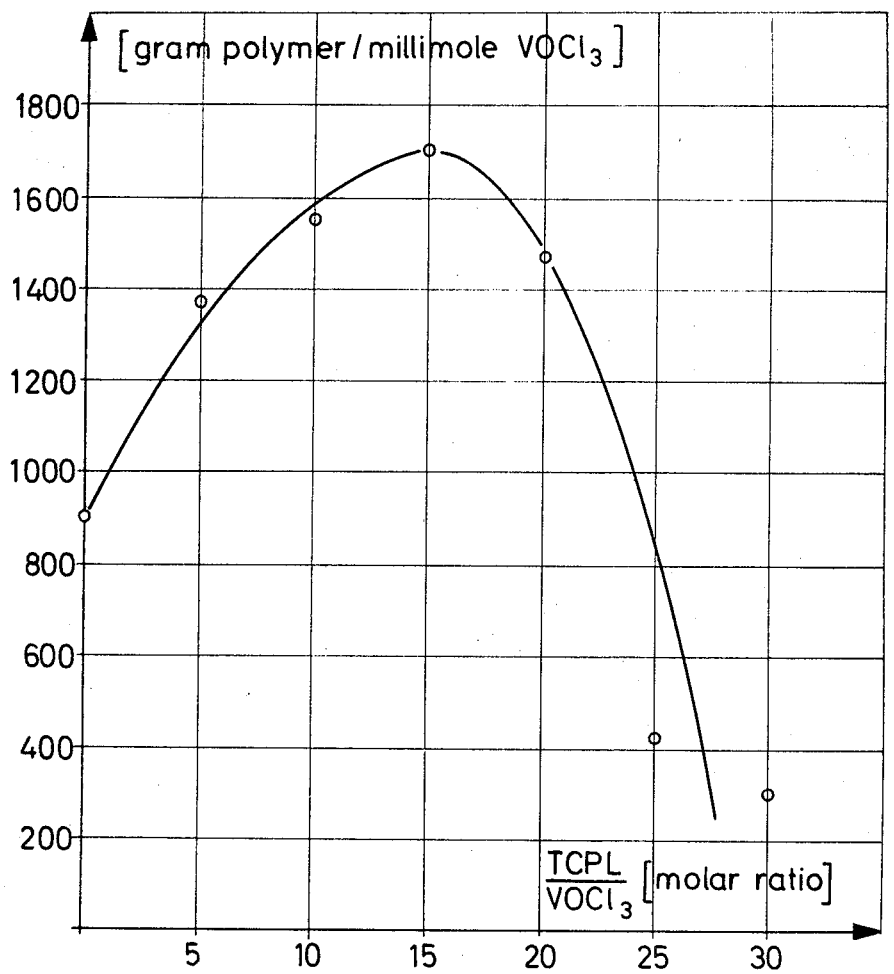

Discontinuous copolymerization of ethylene and propylene in methylene-chloride with varying ratios of β-trichloromethyl-β-propiolactone (TCPL) (cf. also FIG. 2)

General reaction conditions:
Dispersion medium: Methylene chloride
Molar ratio: Al:V=100:1
V-concentration: 0.1 millimole/liter
Polymerization temperature: +15° C.

| Example | TCPL/ vanadium oxytri- chloride (molar ratio) | Yield (g.) | Catalyst efficiency (g. of polym. millimole of VOCl₃) | $\mu$ red [1] | Mooney viscosity, ML₄ [2] | C₃ in polymer (Percent by weight) | Percent insol- uble in toluene |
|---|---|---|---|---|---|---|---|
| 3a [3] | 0:1 | 180 | 900 | 3.5 | 120 | 35 | 0.2 |
| 3b | 5:1 | 275 | 1,375 | 2.6 | 81 | 39 | 1 |
| 3c | 10:1 | 310 | 1,550 | 3.1 | 120 | 42 | 0.2 |
| 3d | 15:1 | 340 | 1,700 | 3.4 | 120 | 41 | 0.1 |
| 3e | 20:1 | 295 | 1,475 | 3.4 | 120 | 43 | 1.0 |
| 3f | 25:1 | 85 | 425 | 2.2 | 63 | 46 | 0.3 |
| 3g | 30:1 | 60 | 300 | 1.91 | 44 | 45 | 0.3 |

[1] $\mu$ red: reduced specific viscosity, measured at 135° C. in 0.1% dekahydronaphthalene solution.
[2] Determined according to DIN 53 523 at 100° C.
[3] Comparison test.

EXAMPLE 4

Precipitation polymerization in methylene-chloride

Discontinuous terpolymerization of ethylene/propylene and 5-ethylidene-norbornene-2 in methylene-chloride with varying molar ratios of β-trichloro-methyl-β-propiolactone (TCPL) to vanadium oxytrichloride.

The copolymerization is carried out as described in Example 3, but with a taking up of 10 liters of gaseous ethylene per hour, 1 milliliter of a solution of 15.1 milliliters of 5-ethylidene-norbornene-(2) in 100 milliliters of methylene-chloride is dropwise added during polymerization. With this dosage there is obtained an unsaturated ethylene/propylene rubber of 3.8–4.2 c=c/1000 (iodometrically determined) which after vulcanization with a usual sulfur accelerator system yields vulcanized products showing good static and dynamic vulcanization properties.

The products obtained show the following properties:

$\mu_{red}$=2.2–3.5
Mooney viscosity ML₄=60–120
Percent by weight of propylene in the polymer (IR-spectroscopically determined)=35–45%
Percent by weight insoluble in toluene≦0.1%

TABLE 4

Discontinuous terpolymerization of ethylene/propylene and 5-ethylidene-norbornene-2 in methylene-chloride with varying molar ratios of β-trichloro-methyl-β-propiolactone (TCPL) to vanadium oxytrichloride.

General reaction conditions:
Dispersion medium: Methylene-chloride
Molar ratio: Al:V=100:1
V-concentration: 0.1 millimole/liter
Polymerization temperature: +15° C.

| Example | TCPL:VOCl₃ (molar ratio) | Yield [g.] | Catalyst efficiency [grams of polymer/milli- mole of VOCl₃] |
|---|---|---|---|
| 4a | 10=1 | 150 | 750 |
| 4b | 5=1 | 260 | 1,300 |
| 4c | 10=1 | 300 | 1,500 |
| 4d | 15=1 | 335 | 1,675 |
| 4e | 20=1 | 280 | 1,400 |

I claim:
1. Process for the copolymerization of ethylene with α-olefins of the formula R—CH=CH₂, wherein R represents an aliphatic branched or straight chained hydrocarbon radical with less than 7 carbon atoms, or with one of said α-olefins together with a diolefin in an amount such that the terpolymer formed has an iodine number not greater than 50, in the presence of inert solvents or dispersion media, the copolymerization being carried out under pressures in the range of from 0 to 30 atmospheres gauge and at temperatures in the range of from −30 to +50° C., with coordination catalysts of 3- to 5-valent vanadium compounds and organo-aluminum compounds, both soluble in the inert solvent or dispersion medium used, with stirring or other mechanical agitation, which comprises carrying out the polymerization
 (1) by using the vanadium compounds in concentrations in the range of from 0.001 to 0.1 millimole per liter of inert solvent or dispersion medium,
 (2) by using organo-aluminum compounds the molar ratio of aluminum to vanadium of which being in the range of from 20:1 to 200:1,
 (3) in the presence of mono- or di-trihalomethyl substituted β-lactones as reactivators, the molar ratio of reactivator to vanadium compound being in the range of from 5:1 to 100:1 and wherein the halo substituent of the halomethyl group is chloro, bromo, or fluoro.

2. Process as claimed in claim 1 wherein the molar ratio of aluminum to vanadium in the coordination catalysts amounts to 30:1 to 100:1.

3. Process as claimed in claim 1 wherein the molar ratio of reactivator to vanadium compound amounts to 5:1 to 20:1.

4. Process as claimed in claim 1 wherein vanadium oxytrichloride is used as vanadium compound.

5. Process as claimed in claim 1 wherein ethyl-aluminium-sesquichloride is used as aluminium compound.

6. Process as claimed in claim 1 wherein β-trichloromethyl-β-propiolactone or β,β-bis-(trichloromethyl)-β-propiolactone is used as reactivator compound.

7. Process as claimed in claim 1 wherein ethylene is copolymerized with propylene or isobutene.

8. Process as claimed in claim 1 wherein aliphatic halohydrocarbons are used as dispersion medium.

9. Process as claimed in claim 1 wherein methylene chloride or 1,2 - dichloro-ethane are used as dispersion medium.

10. Process as claimed in claim 1 wherein hexane is used as solvent.

11. Process as claimed in claim 1 wherein 1,4-cis-hexadiene, 1,4-trans-hexadiene or dicyclopentadiene are used as diolefin.

12. Process as claimed in claim 1 wherein an alkenyl-norbornene is used as diolefin.

13. Process as claimed in claim 1 wherein 5-(2′-methyl-2′-butenyl)-norbornene-2 or 2-(3′-methyl-2′-butenyl)-norbornene-2 or mixtures of both compounds are used as diolefin.

14. Process as claimed in claim 1 wherein an alkylidene-norbornene is used as diolefin.

15. Process as claimed in claim 1 wherein 5-methylene-norbornene-2 or 5-ethylidene-norbornene-2 is used as diolefin.

References Cited

UNITED STATES PATENTS

| 3,149,097 | 9/1964 | Coover | 260—93.7 |
| 3,301,834 | 1/1967 | Christmas | 260—80.5 |
| 3,365,434 | 1/1968 | Coover | 260—93.7 |
| 3,380,981 | 4/1968 | Miller | 260—93.7 |
| 3,397,196 | 8/1968 | Shearer | 260—93.7 |
| 3,415,801 | 12/1968 | Coover | 260—93.7 |

JOSEPH L. SCHOFER, Primary Examiner

E. J. SMITH, Assistant Examiner

U.S. Cl. X.R.

252—429 B; 260—88.2, 94.9 C